United States Patent
Hwang et al.

(10) Patent No.: US 9,717,376 B2
(45) Date of Patent: Aug. 1, 2017

(54) FACIAL CLEANSING APPARATUS USING ELECTRIC MOTOR AND SPRING, CONTROL METHOD THEREFOR, AND RECORDING MEDIUM RECORDING PROGRAM FOR PERFORMING CONTROL METHOD

(71) Applicants: Amorepacific Corporation, Seoul (KR); Sentronix Co., Ltd., Suwon-si (KR)

(72) Inventors: Cheonghwan Hwang, Seoul (KR); Sohee Kim, Seoul (KR); Wooram Park, Seoul (KR); Yoon-hee Lee, Seoul (KR); Hyeseong Nam, Seoul (KR); Chilsung Lee, Suwon-si (KR); Jeongmin Lee, Suwon-si (KR); Hyoyoung Kim, Suwon-si (KR)

(73) Assignees: AMOREPACIFIC CORPORATION, Seoul (KR); SENTRONIX CO., LTD., Suwon (KR)

( * ) Notice: Subject to any disclaimer, the term of this patent is extended or adjusted under 35 U.S.C. 154(b) by 0 days.

(21) Appl. No.: 14/778,232

(22) PCT Filed: Sep. 27, 2013

(86) PCT No.: PCT/KR2013/008674
§ 371 (c)(1),
(2) Date: Sep. 18, 2015

(87) PCT Pub. No.: WO2014/148710
PCT Pub. Date: Sep. 25, 2014

(65) Prior Publication Data
US 2016/0278584 A1   Sep. 29, 2016

(30) Foreign Application Priority Data

Mar. 19, 2013 (KR) .......................... 10-2013-0028936

(51) Int. Cl.
*B08B 7/00* (2006.01)
*A47K 7/04* (2006.01)
(Continued)

(52) U.S. Cl.
CPC ............ *A47K 7/043* (2013.01); *A46B 13/008* (2013.01); *A46B 13/026* (2013.01); *A61H 7/005* (2013.01);
(Continued)

(58) Field of Classification Search
CPC ........... A46B 13/008; A46B 7/04; A46B 9/06; A46B 13/023; A46B 2200/102; A47K 7/043; A61H 23/0263
(Continued)

(56) References Cited

U.S. PATENT DOCUMENTS 5,821,707 A * 10/1998 Kim .......................... H02P 6/08
318/400.01
6,730,051 B2 * 5/2004 Lin ....................... A61H 9/0071
15/29
(Continued)

FOREIGN PATENT DOCUMENTS

JP    2009-207537 A    9/2009
KR    10-0648464 B1    11/2006

*Primary Examiner* — Duy Deo
*Assistant Examiner* — Maki Angadi
(74) *Attorney, Agent, or Firm* — East West Law Group; Heedong Chae

(57) ABSTRACT

An apparatus for washing skin uses a brushless electric motor and a spring. The apparatus may include a case; an operation unit installed outside the case; a power supply unit installed at one end inside the case; the brushless electric motor installed inside the case; a control unit to output an electric signal; a face-washing brush fitted with a shaft of the (Continued)

brushless electric motor to be rotated forward and reverse as the brushless electric motor is operated; a holder and a spring.

4 Claims, 14 Drawing Sheets

(51) Int. Cl.
      *A61H 7/00*         (2006.01)
      *A61H 23/02*      (2006.01)
      *A46B 13/00*      (2006.01)
      *A46B 13/02*      (2006.01)
      *B08B 1/00*       (2006.01)
      *B08B 1/04*       (2006.01)
      *H02P 6/182*      (2016.01)
      *H02P 27/08*      (2006.01)

(52) U.S. Cl.
     CPC ......... *A61H 23/0263* (2013.01); *B08B 1/002* (2013.01); *B08B 1/04* (2013.01); *H02P 6/182* (2013.01); *H02P 27/08* (2013.01); *A45D 2200/1054* (2013.01); *A46B 2200/1006* (2013.01); *A61H 2201/5005* (2013.01); *A61H 2201/5038* (2013.01)

(58) Field of Classification Search
     USPC ........ 134/6, 44, 46; 15/22.1; 601/46, 67, 68, 601/72, 80, 81
     See application file for complete search history.

(56) References Cited

U.S. PATENT DOCUMENTS

| | | | |
|---|---|---|---|
| 2006/0135891 A1 | 6/2006 | Jordan | |
| 2008/0018281 A1* | 1/2008 | Kim | H02P 6/34 318/445 |
| 2011/0009783 A1* | 1/2011 | Dverin | A61B 18/14 601/137 |
| 2013/0060176 A1* | 3/2013 | Nichols | A46B 13/023 601/137 |

\* cited by examiner

PRIOR ART

PRIOR ART

PRIOR ART

FACIAL CLEANSING APPARATUS USING ELECTRIC MOTOR AND SPRING, CONTROL METHOD THEREFOR, AND RECORDING MEDIUM RECORDING PROGRAM FOR PERFORMING CONTROL METHOD

BACKGROUND OF THE INVENTION

1. Field of the Invention

The present invention relates to an apparatus for washing skin using an electric motor and a spring, a method of controlling the same apparatus and a medium of recording a program for performing the same method. More particularly, the present invention relates to a skin washing apparatus in which a vibration is made by a forward/rearward rotation through an interaction between a motor and a leaf spring to optimally wash a skin while the current consumption is minimized, a method of controlling the same apparatus and a medium recording a program for performing the same method.

2. Description of the Related Art

In general, everybody wants to obtain beauty of their body. To pursue the beauty of one's body, specifically skin, skin is kept clean and a systematic skin management is required. To this end, a skin management apparatus has be developed and used. In addition, various types of skin manage apparatus are developed and used to meet the characteristics of each part of body.

Specifically, a most basic method of managing the treatment of facial skin among parts of body is to treat facial skin using cosmetics. Currently, functional cosmetics have been mainly used as the cosmetics for managing a skin treatment.

Meanwhile, various apparatus for washing a face have been proposed until now. Two-type vibration schemes have been mostly applied to rotate a washing brush, one of which is to simply make rotation and the other is to generate a vibration.

Since the scheme of rotating a washing brush through the simple rotation of a motor is very general, the detailed description will be omitted. Hereinafter a method of applying an eccentric disc and a basic concept of a motor rotated in a circular screw motion will be described in brief.

First, a general eccentrically rotatable vibration motor is depicted in FIG. 1. As shown in FIG. 1, a PCB mounting unit 1 may be formed in a lower case 2. A permanent magnet 3 is fixed to an upper portion of the lower case 2. A rotor 7 is rotatably installed on the permanent magnet 3, which serves as a stator, with a predetermined gap between them. The rotor 7 includes a coil 8 and a segment 9 such that the rotor 7 is eccentric as a whole. In addition, the rotor 7 itself has the mass center eccentric to one side, so that the rotor 7 itself is operated as the eccentric mass.

To allow the rotor of the vibration motor to be rotated in a predetermined direction, a rectifier circuit, which exchanges the coils to which current is provided, is required. A current circuit of a coin type vibration motor includes a brush 5 electrically connected to a PCB circuit of a PCB circuit substrate 6 and segments 9. When reviewing the rotation principle of the coin type vibration motor, the DC power input from the PCB circuit 4 is provided to a coil part through the segments 9 making contact with the brush 5. In this case, since the segments 99 making contact with the brush 5 are exchanged by the rotating rotor, the rectification is achieved.

Second, there is a vibration scheme of employing a voice coil which is the most applied to a hard disc drive, so the vibration scheme of employing a voice coil will be described in brief with reference the hard disc drive. As shown in FIG. 2, a hard disc drive includes a magnetic disk 110 rotatably installed to a spindle motor (not shown) installed to base frame 100, a magnetic head actuator 200 rotated about a pivot shaft P to allow a magnetic head h to fly over the disk 110, and although not shown, a cover frame coupled to the base frame 100 to block inflow of a foreign substance and to protect the disk 110 and the magnetic head actuator 200. Reference numeral 120 denotes a circuit driving unit for performing signal transmission between a main circuit substrate (not shown) interfacing with a main apparatus such as a computer and the magnetic head h and for controlling the magnetic head actuator 200.

As shown in FIG. 3, the magnetic head actuator 200 includes a voice coil motor (VCM) 210 having lower and upper yokes 211 and 212 to which a pair of magnets M facing each other are attached, a swing arm 220 rotated about the pivot shaft P by the voice coil motor 210 as a head stack assembly (HAS), a suspension 230 supported by the swing arm 220 and having a front end to which the magnetic head h is installed, and a bobbin 230 branching off from the swing arm 220 to be positioned between the magnets M and on which the coil 231 is wound.

The voice coil motor 210, which is a sort of driving motor for rotating the swing arm 220 to allow the magnetic head h to a desired position on the disk, utilises Fleming's left hand rule, that is, a principle of generating force when current flows through a conductor in magnetic field. Thus, when current is applied to the coil 231 positioned between the magnets M, the voice coil motor 210 forces the bobbin 230 to be rotated. Thus, the swing arm 220, which branches off corresponding to the bobbin 230, is rotated, such that the magnetic head h supported on the end flies radially over the rotating disk 110 in order to search tracks to access data. Then, the accessed data are processed by the circuit driving unit 120 and then, are recorded or output, for example, in or to a computer.

Meanwhile, although the skin washing apparatus currently employs a rotation motor or a system of performing an arc screw reciprocating motion, the products are increased in size and the consumption power is increased, so that the battery lifetime is reduced.

In addition, direction in the related art, since the motor is rotated in a unique and a cleaning solution is coated on a face while the skin washing brush is rotated in the unique direction, it is difficult to allow the cleaning solution to make uniform contact with the face.

SUMMARY OF THE INVENTION

The present invention has been made in an effort to solve the above-described problems associated with the related art. The present invention provides an apparatus for washing skin using an electric motor and a spring which is capable of easily washing skin through a forward/rearward rotation and has a strong torque by using a spring force to allow a face-washing brush to press skin at a strong pressure, so that the skin washing efficiency is maximized, a method of controlling the same apparatus and a medium of recording a program for performing the same method.

To achieve the object, according to one aspect of the present invention, there is provided an apparatus for washing skin using a brushless electric motor and a spring. The apparatus includes a case (100); an operation unit (200) installed outside the case to generate a switching signal to allow the apparatus to be powered on or off and the brushless electric motor to be rotated forward and reward in units of a predetermined angle; a power supply unit (300) installed at one end inside the case; the brushless electric motor (400) installed inside the case to be operated by power applied from the power supply unit according to the switching signal from the operation unit, such that the brushless electric motor (400) is rotated in units of the predetermined angle; a control unit (500) to output an electric signal in order to control the forward and rearward rotation of the brushless power at the predetermined angle according to the switching signal; a face washing brush (600) fitted with a shaft of the brushless electric motor to be rotated forward and reverse as the brushless electric motor is operated; a holder (700) installed to the shaft of the brushless electric motor and including vertical and horizontal panels bent in a L-shape, wherein the holder is rotated forward and reverse as the brushless electric motor is rotated forward and reverse; a spring (800) including one side coupled to the horizontal panel of the holder and an opposite side coupled to a support, wherein the spring moves along the support to generate a torque toward an original position by an elastic property as the holder moves upward and downward in a vertical direction; and the support (900) to support the opposite side of the spring.

The apparatus further includes a balance weight (1000) provided to an upper portion of the holder to absorb a vibration caused by the forward and reverse rotation of the holder.

The spring (800) includes a coil spring or a leaf spring.

The holder (700) includes a moving hole (710) through which the leaf spring slides.

The control unit (500) includes a rectifying unit (510) including a rectifier (511) and a smoothing condenser (512) to rectify and smooth AC power in order to provide DC power; an inverter (530) to convert the DC power supplied from the rectifying unit (510) into three-phase AC power (U, V and W) in a pulse form having an arbitrary variable frequency and to supply the three-phase AC power to the brushless electric motor (400), the inverter including six switching devices (Q1 to Q6) and diodes; a terminal voltage detecting unit (560) to detect terminal voltages of each phase (U, V and W) from the three-phase AC power supplied to the brushless electric motor (400); a control circuit (570) to obtain information about a position of the rotor by detecting zero cross points of back electromotive force based on the terminal voltages of each phase (U, V and W) detected by the terminal voltage detecting unit (560), and to control a pattern of a PWM signal provided to the inverter (530) in order to allow a rotor of the brushless electric motor to be rotated forward and reverse at the predetermined angle; and a PWM signal generating unit (580) to generate the pattern of the PWM signal under control of the control circuit (570) and provides the pattern of the PWM signal to the inverter (530).

According to another aspect of the present invention, there is provided a method of controlling an apparatus for washing skin using a brushless electric motor and a spring. The method includes initially driving the brushless electric motor (400) when an operation unit outputs a switching signal (S10); detecting back electromagnetic force as a rotor is rotated during the initial driving of the brushless electric motor (400) (S20); outputting a PWM driving signal to forwardly rotate the rotor a predetermined angle based on a position of the rotor when the position of the rotor is detected (S30); and outputting a PWM signal to reversely rotate the rotor when the rotor is forwardly rotated at the predetermined angle set in the operation unit (S40).

According to still another aspect of the present invention, there is provided a computer readable recording medium of storing program codes to perform a method of controlling an apparatus for washing skin using a brushless electric motor and a spring. The program codes includes a program code of initially driving the brushless electric motor (400) when an operation unit outputs a switching signal; a program code of detecting back electromagnetic force as a rotor is rotated during the initial driving of the brushless electric motor (400); a program code of outputting a PWM driving signal to forwardly rotate the rotor a predetermined angle based on a position of the rotor when the position of the rotor is detected; and a program code of outputting a PWM signal to reversely rotate the rotor when the rotor is forwardly rotated at the predetermined angle set in the operation unit.

According to the present invention, the skin washing operation is easily performed by rotating a face-washing brush in a forward/rearward direction using a rotational motor and a strong torque is provided by is sing a spring force to allow the face-washing brush to press a strong press skin at a strong pressure, so that the skin washing efficiency is maximized.

DETAILED DESCRIPTION OF THE INVENTION

Hereinafter, an operation principle of exemplary embodiments of the present invention will be described in detail with reference to the accompanying drawings. However, the drawings and the description thereof correspond to exemplary embodiments of the present invention among various methods for effectively describing the features of the present invention, and the present invention is not limited to the drawings and description.

In the following description of the present invention, a detailed description of known functions and configurations incorporated herein will be omitted when it may make the subject matter of the present invention rather unclear. Further, the following terms are those defined, considering the functions of the present invention, and may be changed according to the intentions of the user or the manager or the customs. Therefore, the definitions of the terms should be made based on the contents of the specification.

Here, in the description of the embodiments of the present invention, in order to effectively describe the technical elements of the present invention, system elements that are included in a functional configuration of the system or conventionally provided in the technical field of the present invention will be omitted and functional elements that should be additionally provided for the present invention will be mainly described.

Those skilled in the art to which the present invention pertains can understand functions of conventionally used constituent elements that are not illustrated but omitted, and also can clearly understand the relationships between the omitted elements and the added elements of the present invention.

In the embodiments of the present invention, the terms will be properly modified to effectively describe the technical features of the present invention so that those skilled in the art can clearly understand the present invention, but the present invention is not limited to the embodiments.

As a result, the spirit of the present invention is determined by the claims, and the embodiments of the present invention are merely means for effectively describing the spirit of the present invention to those skilled in the art.

Figure 1:
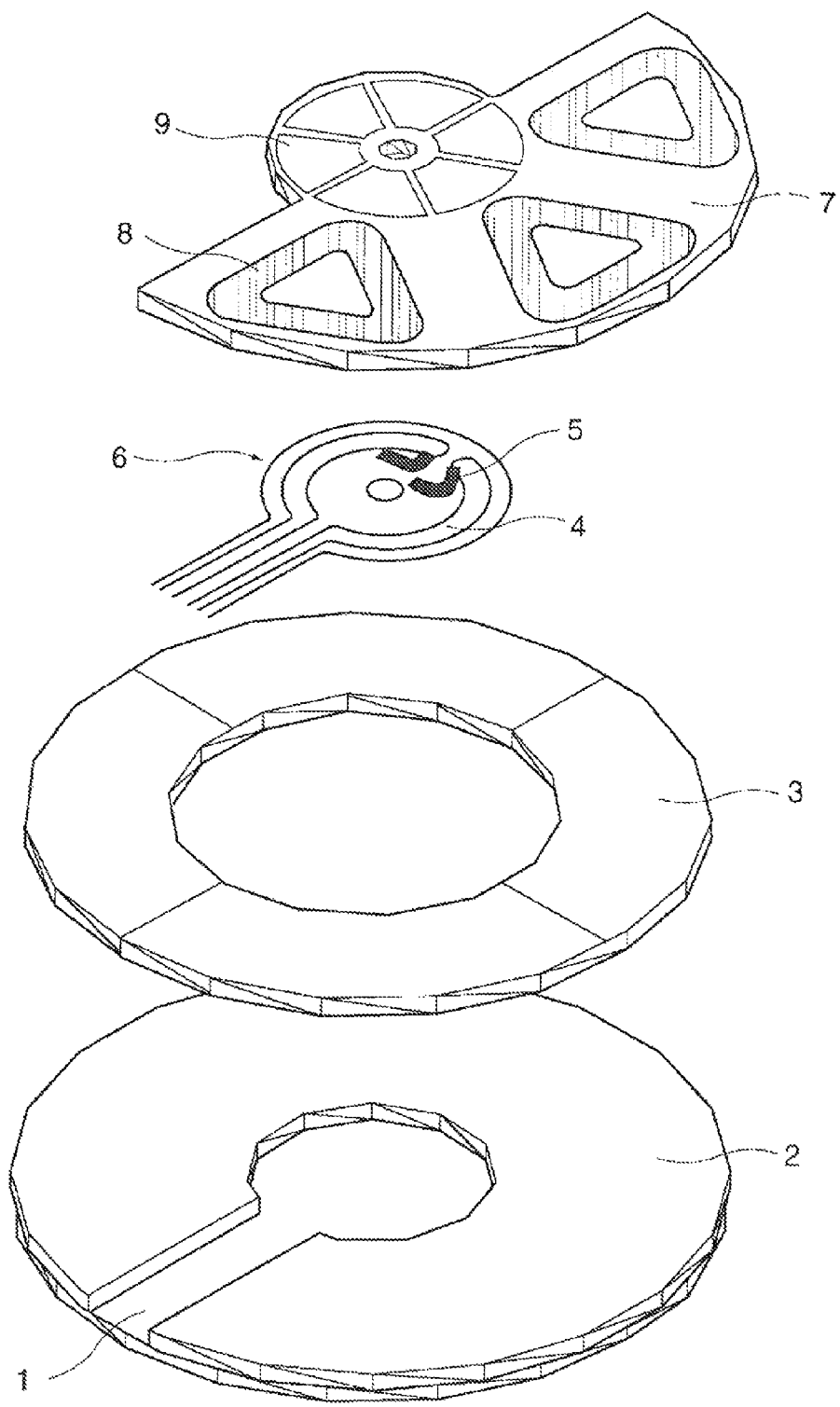
FIG. 1 is a view showing a general eccentrically rotatable vibration motor.
Figure 2:
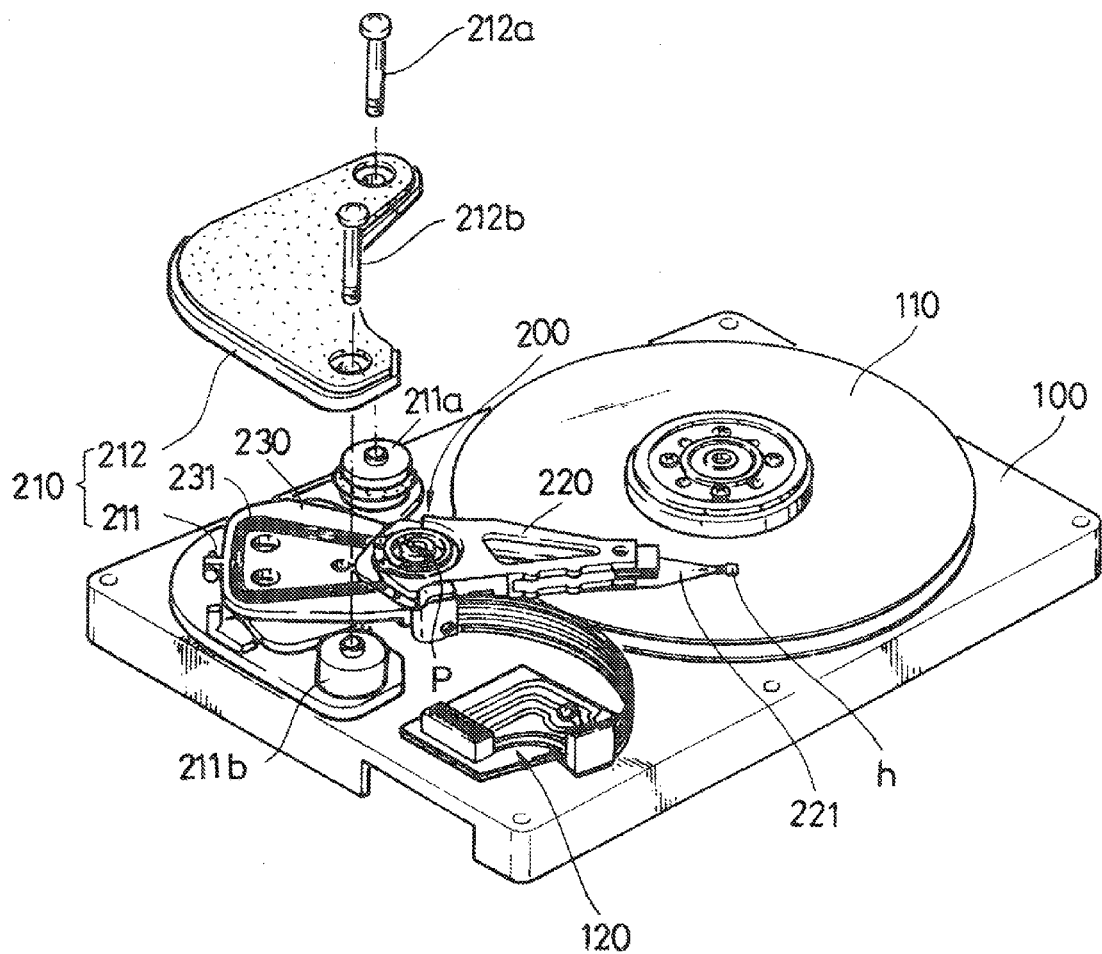
FIG. 2 is a view showing a hard disk drive employing a voice coil.
Figure 3:
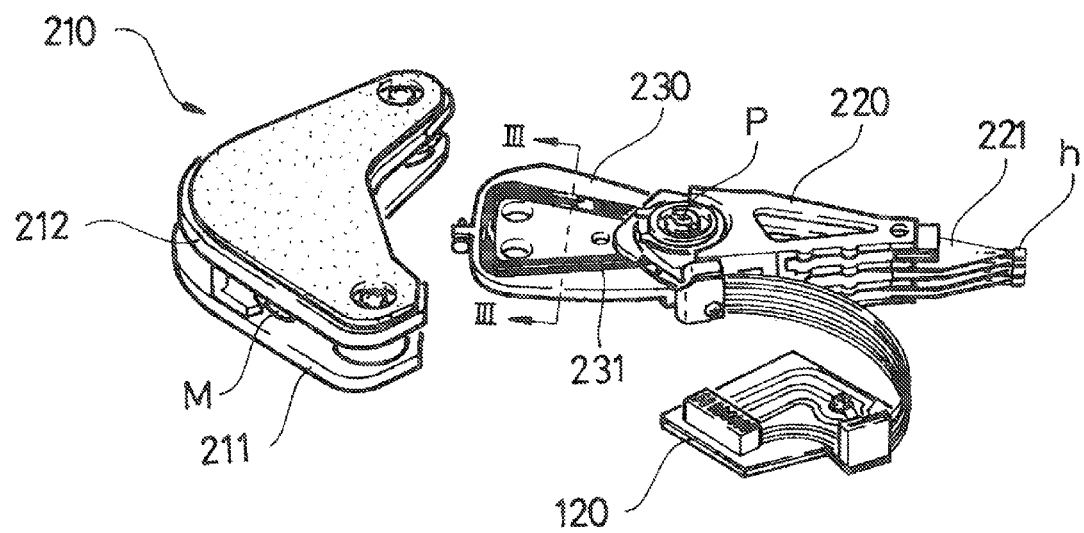
FIG. 3 is a view showing an operation of an actuator employing a voice coil.
Figure 4:
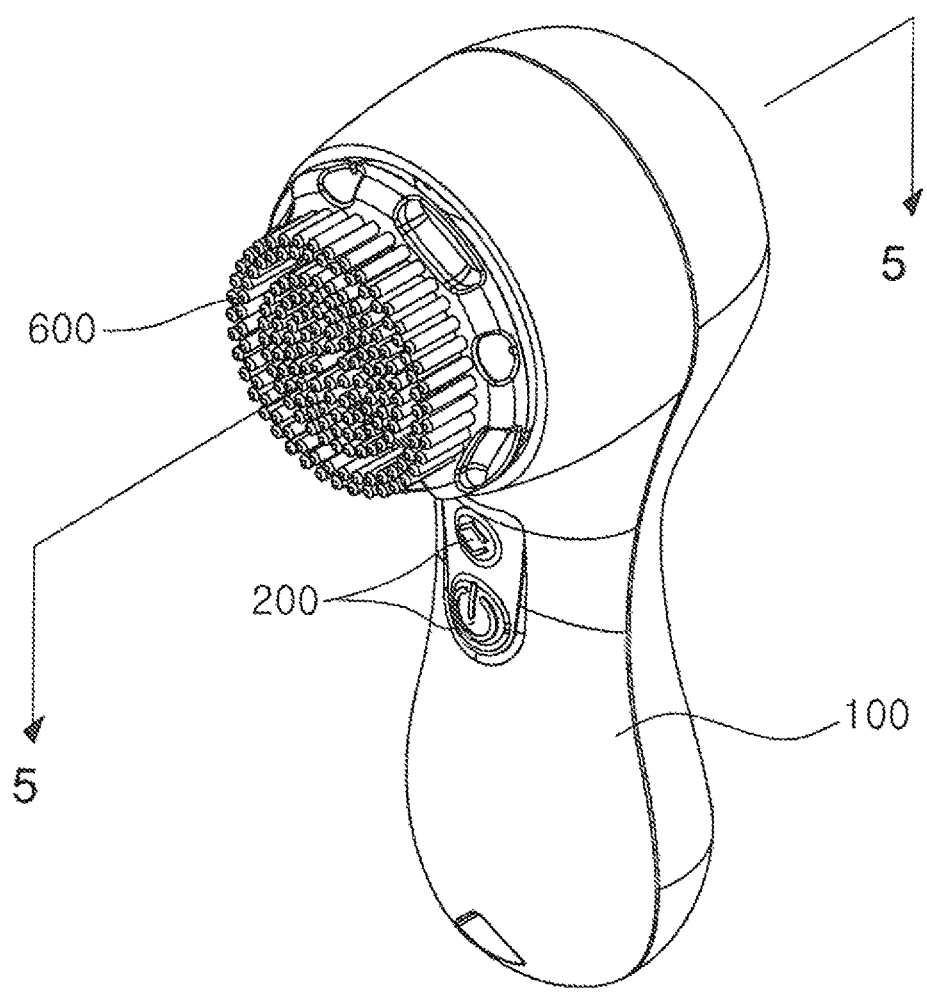
FIG. 4 is a perspective view showing a skin washing apparatus according to an embodiment of the present invention.

FIG. 4 is a perspective view showing an entire configuration of the present invention.

Figure 5:
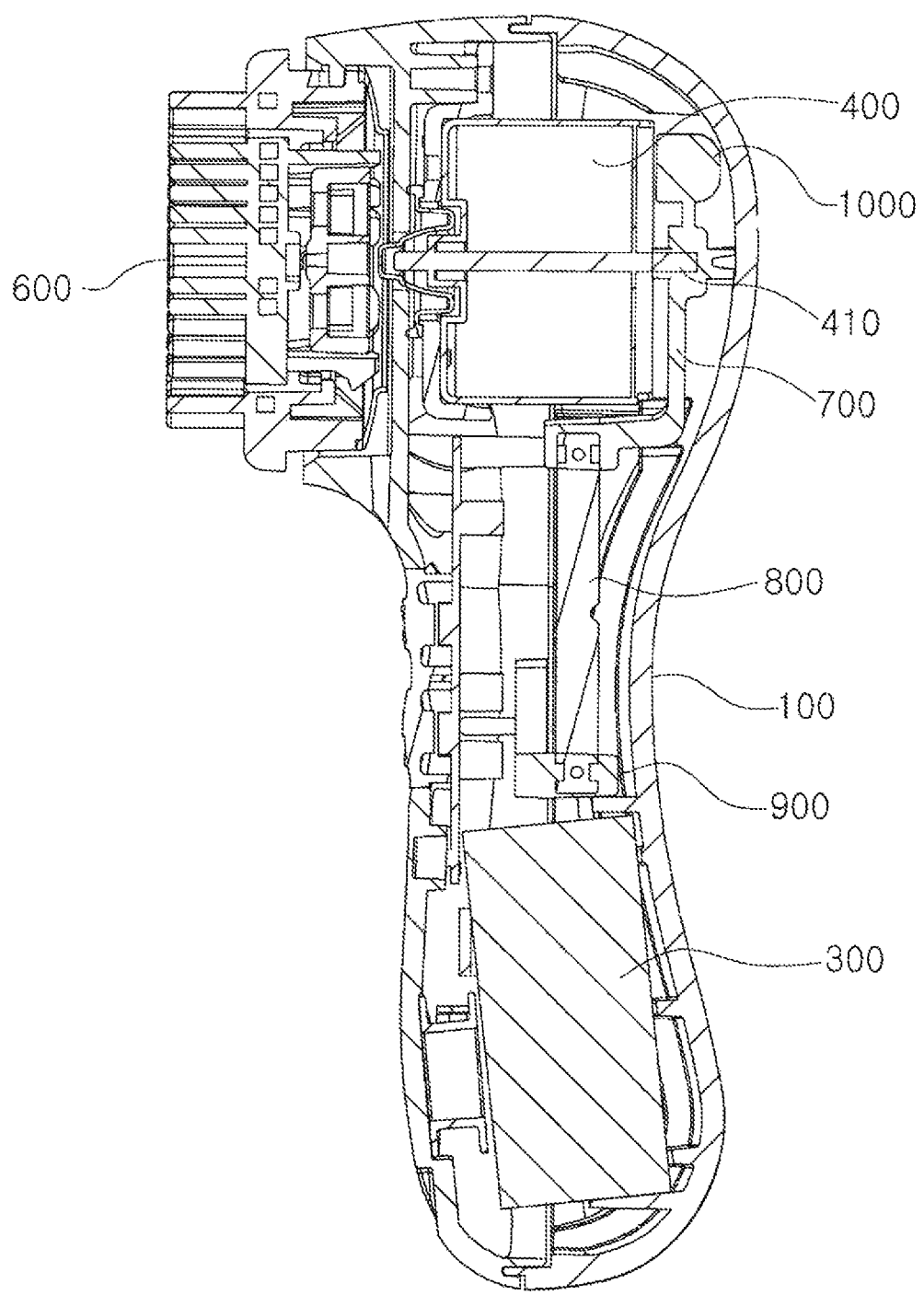
FIG. 5 is a longitudinal sectional view taken along line A-A of FIG. 4.

FIG. 5 is a longitudinal sectional view taken along line A-A of FIG. 4.

Figure 6:
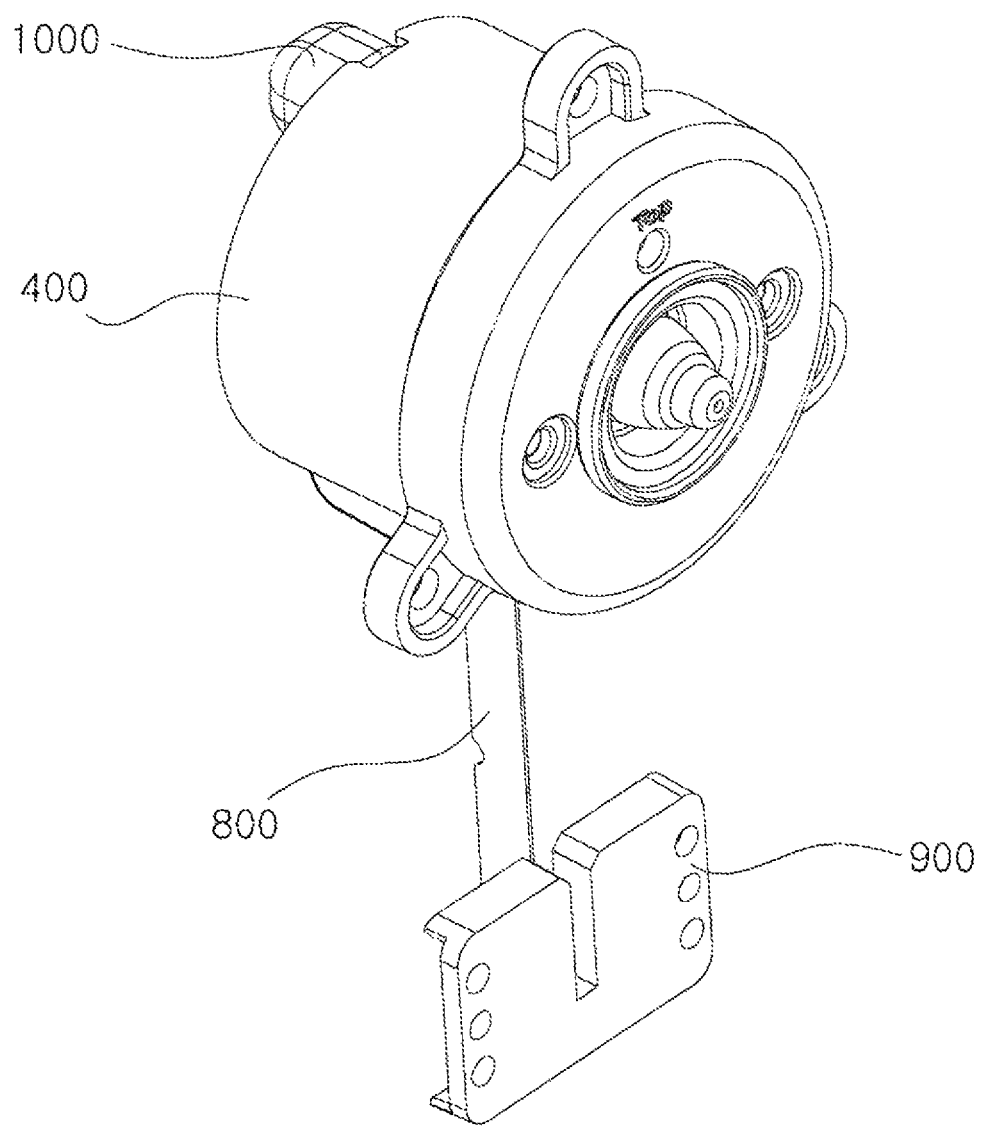
FIG. 6 is a perspective view showing main parts of an electric motor, a spring, and a support according to the embodiment of the present invention.

FIG. 6 is a perspective view showing main parts of an electric motor, a spring, and a support according to the embodiment of the present invention.

Figure 7:
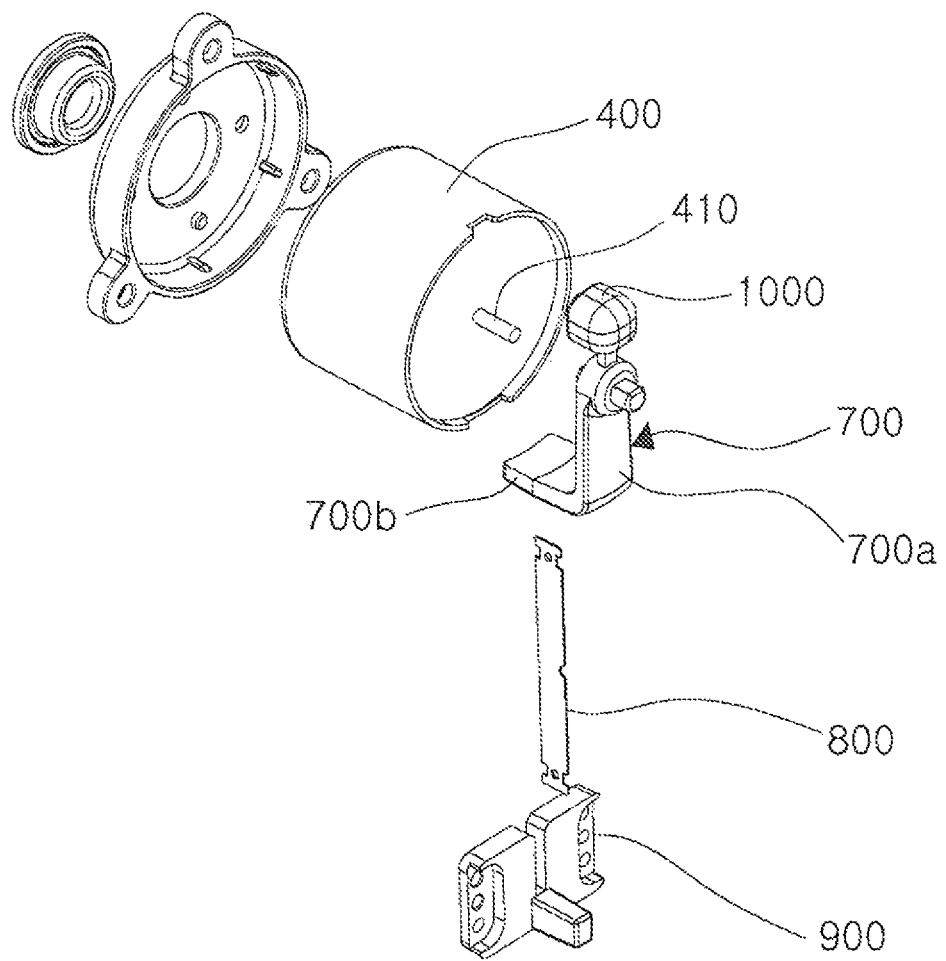
FIG. 7 is an exploded perspective view of FIG. 6.

FIG. 7 is an exploded perspective view of FIG. 6.

Figure 8:
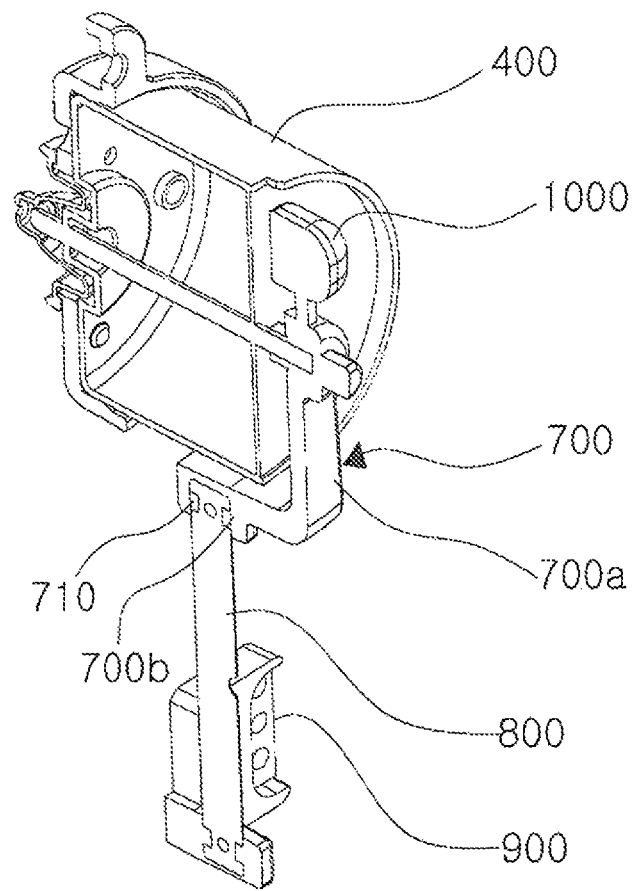
FIG. 8 is a partially cutaway view of FIG. 6.

FIG. 8 is a partially cutaway view of FIG. 6.

Figure 9:
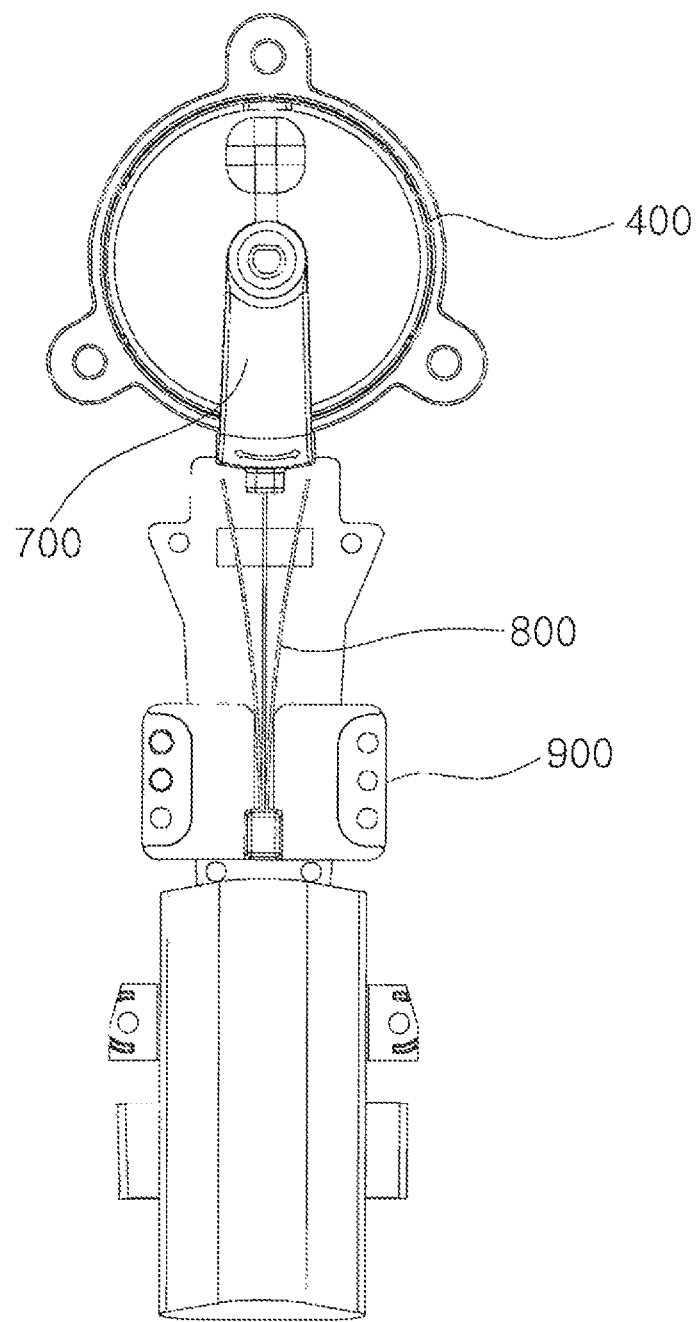
FIG. 9 is a view showing an operation of the spring according to the embodiment of the present invention.

FIG. 9 is a view showing an operation of moving the spring according to the embodiment of the present invention leftward and rightward.

A skin washing apparatus according to the embodiment of the present invention includes a case 100, an operation unit 200, a power supply unit 300, a brushless electric motor 400, a control unit 500, a skin washing brush 600, a holder 700, a leaf spring 600, a support 900, and a balance weight 1000.

The case 100 has an external appearance that can be gripped by a hand. The power supply unit 300 and the brushless electric motor 400 are received in the case 100 and the operation unit 200 is disposed outside the case 100.

The operation unit 200 is installed outside the case 100, and is configured in the type of a toggle or a push button to enable the brushless electric motor 400 to be powered on or off and to be rotated forward/reverse in units of a predetermined angle and to induce the brushless electric motor 400 to be rotated forward and reverse within a necessary angle range.

The power supply unit 300 is installed within the case 100, and serves to supply electric power to the apparatus.

The power supply unit 300 may use a battery or a rechargeable battery, and may be connected to an external power source through a cable to receive electric power through the cable.

The brushless electric motor 400 is installed within the case, and is operated by the electric power applied from the power supply unit 300 according to a switching signal of the operation unit 200 and is rotated forward and reverse in units of a predetermined angle.

The control unit 500 detects a counter electromotive force of the brushless electric motor 400 to recognize a position of the rotor, and outputs an electrical signal for controlling the forward/reverse rotation of the brushless electric motor 400 at a predetermined angle according to the switching signal of the operation unit 200.

The skin washing brush 600 is fitted with the shaft of the brushless electric motor 400 and is rotated forwardly and reversely according to an operation of the brushless electric motor 400 to wash a face of the user.

The holder 700 is connected to the shaft 410 of the brushless electric motor 400, and is L-shaped to include a vertical panel 700a and a horizontal panel 700b. The holder 700 is rotated forwardly and reversely according to the forward/reverse rotation of the brushless electric motor 400.

One side of the spring 800 is coupled to a bottom surface of the horizontal panel of the holder 700 and an opposite side of the spring 800 is coupled to the support 900, such that the spring 800 is moved about the support 900 to provide resiliency to the support 900 to generate a torque to an original location when the holder 700 is moved vertically, upward and downward. Preferably, the spring 800 is a leaf spring having a rectangular panel shape. That is, a coil spring may be employed as the spring 800 if necessary, but a plate spring may be employed for a stronger instantaneous torque. When a plate spring is applied, a movement hole 710 is formed in the holder 700 such that the spring 800 is slid and moved more easily in left and right directions.

The balance weight 1000 is coupled to an upper portion of the holder 700 to absorb the vibration caused by the forward/reverse rotation of the holder 700.

The brushless electric motor (BLDC motor) 400 applied to the present invention essentially includes a stator generating a rotating magnetic field that is rotated spatially, and a rotor in which a permanent magnet is embedded and which is synchronized with a rotating speed of the rotational magnetic field to be rotated relatively, and includes a separate control unit for controlling the rotations of the motor.

That is, the stator of the BLDC motor employs an armature in which a current flows through a three-phase coil, and the rotor employs a permanent magnet in which the N pole and the S pole are repeated. In order that the BLDC motor is rotated continuously, a continuous rotating magnetic field should be formed in the BLDC motor, and in order to form the continuous rotating magnetic field, the currents flowing in the phases of the armature should be commutated at a certain time point. The rotor position should be accurately recognized tor proper commutation. Here, commutation refers to a change of a current direction of the motor stator coil to rotate the rotor.

To smoothly operate the BLDC motor, the rotor position and the phase current should be accurately synchronized with each other. To this end, a device for detecting the position of the rotor is required. Thus, hall sensors, each of which generates a voltage varied according to a variation of magnetic flux, or CTs (Current Transformers), which are installed on each phase of the rotor, may be used to detect the rotor position.

Figure 10:
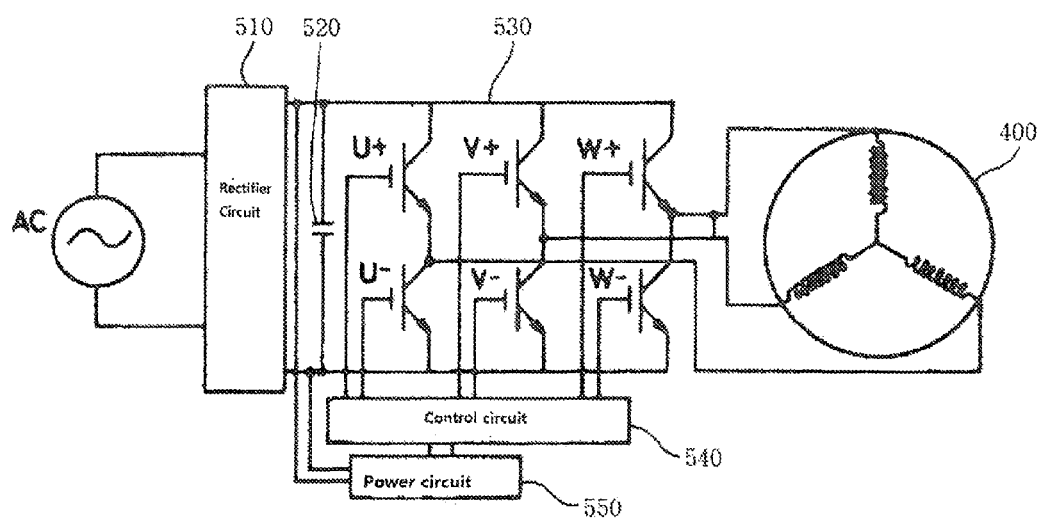
FIG. 10 is a circuit diagram of a control unit according to a first embodiment of the present invention.

As shown in FIG. 10, a control unit 500 includes position sensors (not shown) which are placed between three (U, V and W) phases for sensing the relative position of the rotor with respect to the stator, a rectifier circuit 510 for converting AC power to DC power, a smoothing condenser 520 for removing voltage ripple components from the converted DC power, an inverter circuit 530 which includes a plurality of electric power devices to apply an AC voltage corresponding to a desired average voltage and a frequency to the motor according to switching states of the power devices by selectively providing the DC voltage from the smoothing condenser 520 to the motor, a control circuit 540 for controlling the inverter circuit 530 based on sensed values of the position sensors, and a power circuit 550 for supplying power to the control circuit 540. Reference numeral '1', that is not described in this specification, is a BLDC motor (hereinafter, referred to as "motor") expressed as an equivalent circuit.

The three position sensors (Sa, Sb and Sc) located between the three (U, V and W) phases of the motor 400 outputs sensed values every 60 electrical degrees as the rotor is rotated. The power devices of the inverter circuit 530 are switched according to PWM signals generated from the control circuit 540 based on the sensed values, so that the motor 400 is driven by allowing phase current to flow through two of three (U, V and W) phases, so EMF (Electromotive Force) induced to each phase is generated for 120 electrical degrees.

Meanwhile, when the motor employs the hole sensors, since it is impossible to installed the hole sensors to the motor operated under high-temperature and high pressure environment, so that the motor employing the hole sensors is not used to driving a compressor.

Figure 11A:
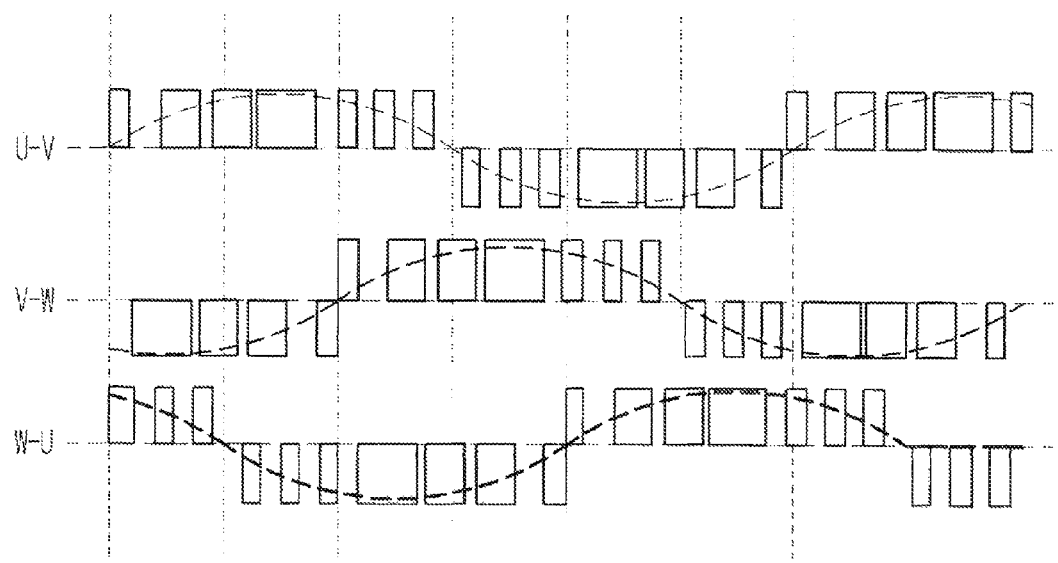
FIGS. 11A and 11B show detection of positions using a CT and a 180 degree sine wave control pattern diagram according to the first embodiment of the present invention.
Figure 11B:
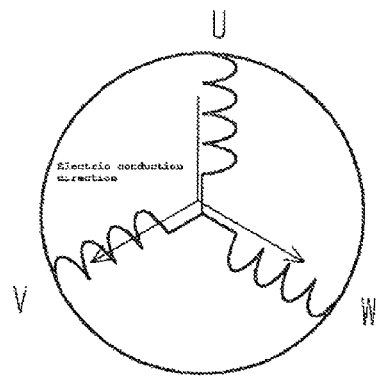

To the contrary, a scheme of detecting the rotor position using a current transformer (CT) is the most ideal control scheme in which a coordinate conversion is performed to resolve the phase currents obtained from each phase into d (direct) axis and q (quadrature) axis components, so that the phase currents is divided into field current and armature current like a brushed DC motor. For this reason, this is a vector control scheme of obtaining a desired torque through a current control. As shown in FIG. 11a, the voltages applied to each phase are in a PWM type and the current waveforms are in a form of a sinusoidal wave. As shown in FIG. 11b, current flows through all of the three-phase coils of the BLDC motor, so the phase efficiency is improved.

Thus, since 180 degrees conduction current control may be performed through the position detection using CT and a back EMF and current have a form of a sinusoidal wave, as a result, a torque ripple is not generated, so that the scheme is good in efficiency and torque, noise and vibration characteristics. However, this scheme uses an expensive CT, requires significant technology to construct a dedicated vector control algorithm, and is attendant on many trials and errors. In addition, the cost of the control is increased due to a complicate control algorithm, and the overall high technology and the fabrication cost become burdened.

To solve the problems, search for a scheme of detecting a rotor position using an electric circuit has been performed. As the result, a scheme of detecting a rotor position using a back electromotive force of a BLDC motor has been widely used.

Figure 12A:
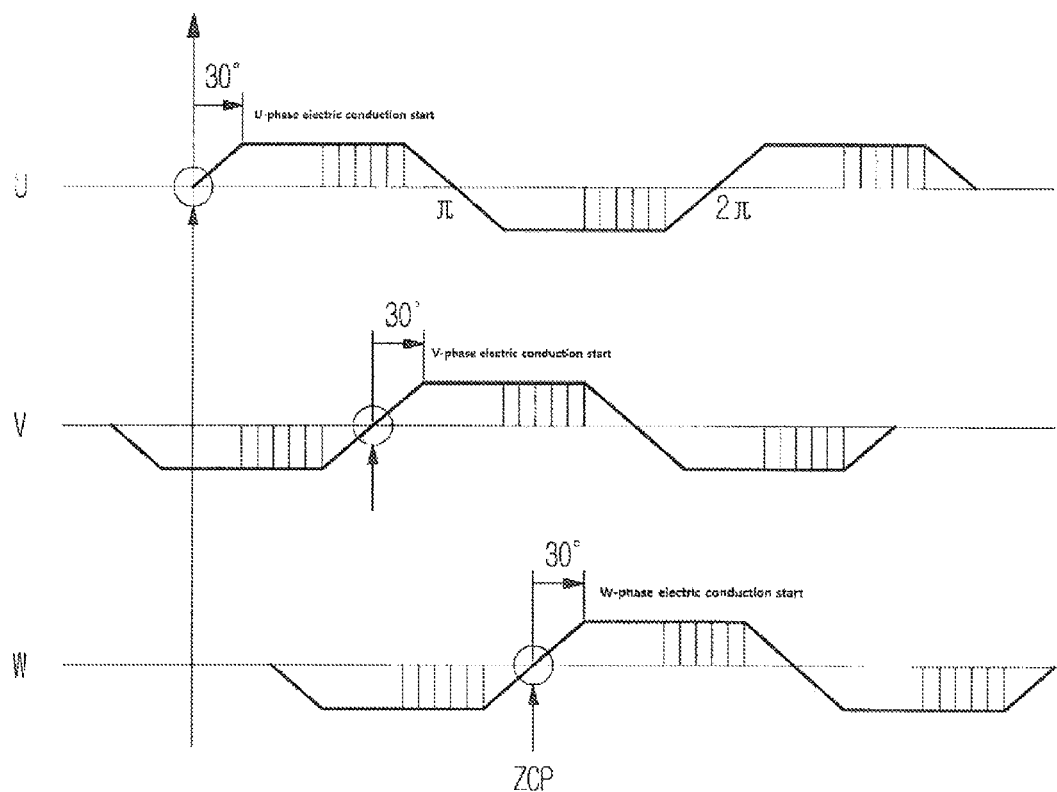
FIGS. 12A and 12b are detection of positions using a counter electromotive force and a 120 degree square wave control pattern diagram according to the first embodiment of the present invention.
Figure 12B:
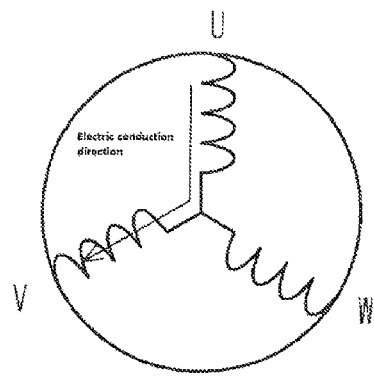

As shown in FIG. 12b, the detection of using a back EMF is achieved by detecting a magnet position inside a rotor based on an EMF generated from one of three phase coils of the motor when the magnetic field is varied as current is provided to the other two phase coils to rotate the rotor. In this case, as shown in FIG. 12a, the EMF is obtained in a trapezoidal form. The motor is controlled by providing current at the time points that the phase angle is delayed at 30 degrees after the ZCP (Zero Cross Point), at which the EMF is zero, is detected.

Figure 13:
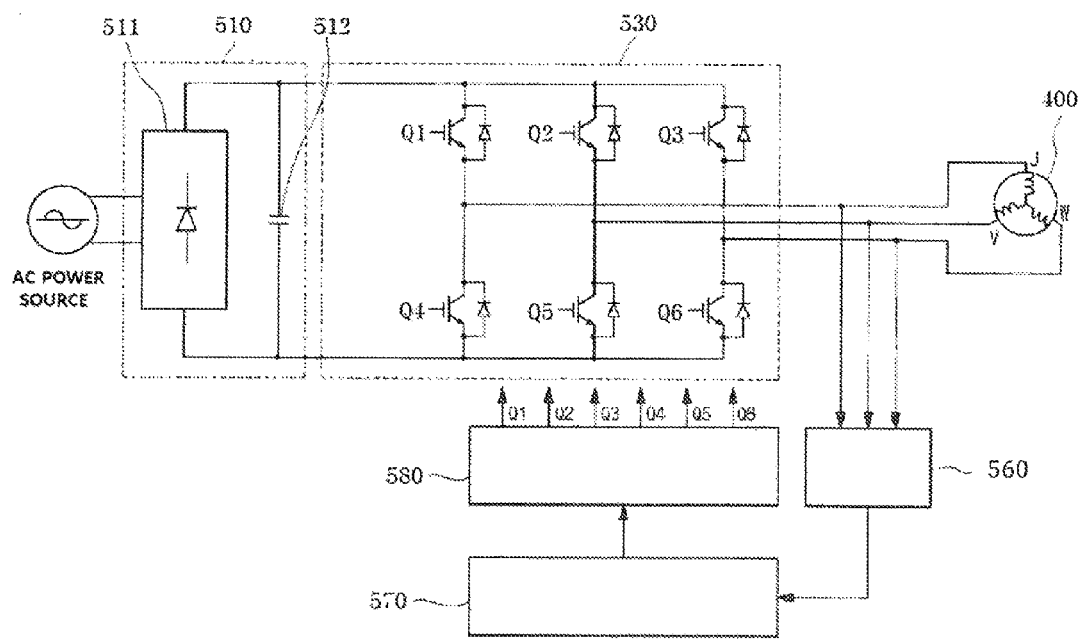
FIG. 13 is a circuit diagram of a control unit according to a second embodiment of the present invention.

Referring to FIG. 13, the apparatus for senselessly driving a BLDC motor includes an amplifying unit 510, an inverter 530, a terminal voltage detecting unit 560, a control circuit 570 and a PVM signal generating unit 580.

The rectifying unit 510, which rectifies and smoothies AC power in order to provide DC power, includes a rectifier 511 and a smoothing condenser 512.

The inverter 530 converts the DC power supplied from the rectifying unit 510 into three-phase AC power (U, V and W) in a pulse form having an arbitrary variable frequency and supplies the three-phase AC power. The inverter 530, which is a conventional switching circuit, includes six switching devices Q1 to Q6 and diodes.

The terminal voltage detecting unit 560 detects terminal voltages of each phase (U, V and W) from the three-phase AC power supplied to the BLDC motor 400 and inputs the detection result to the control circuits 570.

The control circuit 570, which is a microprocessor of controlling a pattern of a PWM signal provided to the inverter 530, obtains information about a position of the rotor by detecting ZCPs of the back EMF based on the terminal voltages of each phase detected by the terminal voltage detecting unit 560. The control circuit 570 executes the entire inverter control algorithm.

The PWM signal generating unit 580 generates a pattern of a PWM signal under the control of the control circuit 570 and provides the PWM signal pattern to the inverter 530.

Figure 14:
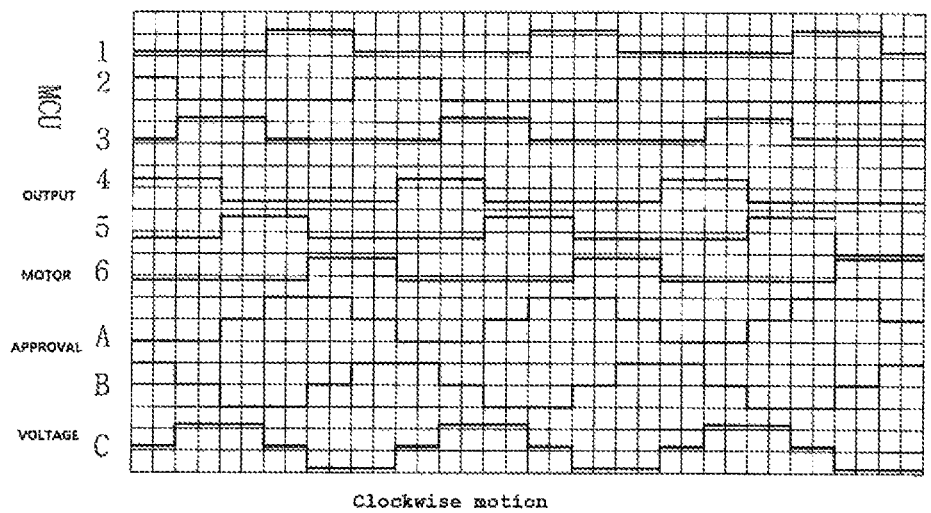
FIG. 14 is a graph depicting output signals of a control unit for rotating a rotor clockwise and counterclockwise and motor voltages according to the second embodiment of the present invention.

FIG. 14 is graphs of a signal output from the control unit and a voltage applied to the motor to rotate the rotor clockwise and counter-clockwise according to the embodiment of the present invention.

Hereinafter a process of controlling a BLDC motor in the above described configuration according to the embodiment of the present invention and operation effect thereof will be described.

According to the present invention, the rotor position of the BLDC motor 400 is detected to achieve perfect control without any torque ripples. To this end, the voltage and current are made in the form of a sinusoidal wave. Even though any control schemes are used to drive the BLDC motor 400, since it is not known at the initial stage where the magnet of the rotor is positioned, an initial driving algorithm is required. Even in this case, since the induced EMF is obtained after the rotor is first rotated, a separated initial driving algorithm is likewise required. The initial driving algorithm which is used to control the BLDC motor 400 is well known in the art. Since a forced alignment scheme, which is generally known in the art, is used in the present invention, the detailed description will be omitted.

Thus, when an initial magnet position of the rotor is obtained, the rotor is synchronized and rotated in a predetermined sequence until the rotation arrives at a predetermined speed, so that induced EMF is generated. After this section, the sinusoidal wave control starts. A PWM control scheme, which is the same as the sinusoidal wave control scheme for an AC induction motor, is used as a driving scheme. Only, various schemes such as a triangular wave scheme or a circle approximation scheme may be applied for a carrier frequency.

As the rotor is rotated, the ZCPs of the induced EMFs generated at each phase are detected and PWM signals generated based on the information about the ZCPs are output. After this time, since the motor is driven through three phase conduction current, the current has a sinusoidal waveform.

In this case, there is an advantage when distribution windings are used as the windings of the BLDC motor 400 in order to easily detect the ZCPs.

Figure 15:
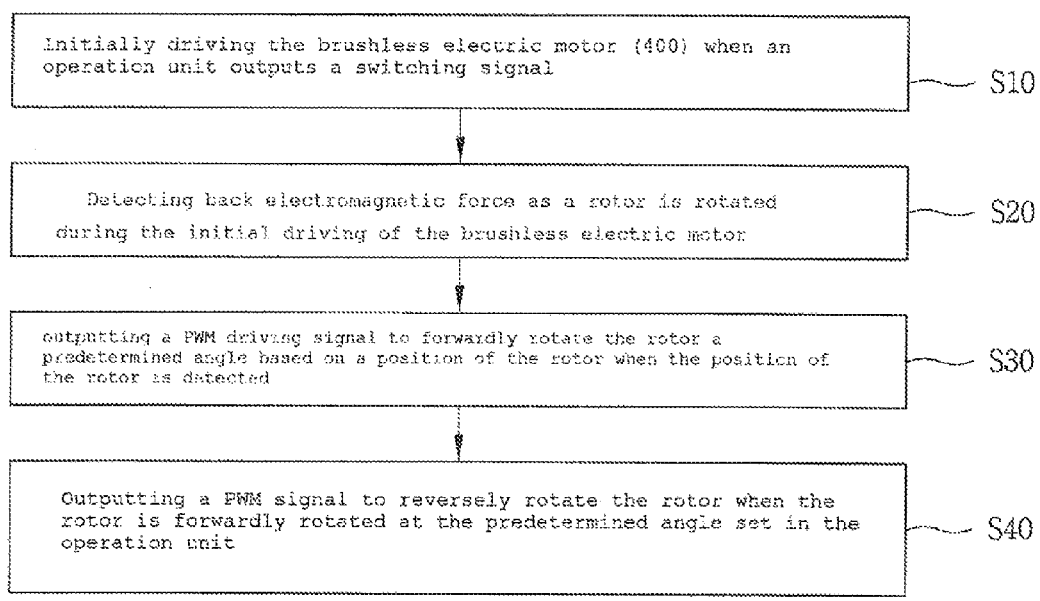
FIG. 15 is a flowchart showing a control operation according to an embodiment of the present invention.

Hereinafter, the entire operation of the present invention will be described with reference to FIG. 15.

When a power switch is switched on by a user, the electric motor is operated.

According to the present invention, the control circuit is programmed to allow the motor 400 to be rotated clockwise and counter-clockwise, so that the face-washing brush 600 vibrates.

That is, the rotor of the BLDC motor 400 is rotated clockwise at a predetermined angle and the rotor is rotated counter-clockwise after check the rotor position using the induced EMF. Thus, by rotating the rotor clockwise and counter-clockwise, the face-washing brush 600 repeats the forward/reverse rotation.

In this case, since the spring 800 is coupled to the holder 700 of the BLDC motor 400, the spring 800 is modified as the holder 700 is rotated forwardly and reversely.

That is, when the holder 700 is rotated clockwise, the spring 800 is bent clockwise. When the holder 700 is rotated counter-clockwise, the spring 800 is bent counter-clockwise.

Since the spring 800 is made of a material having an elastic restoring force, the motor 400, if the spring 800 is bent as the holder 700 is rotated by the rotation of the motor 400, the restoring force of the holder 700 is maximized while a strong torque is generated at the time that the rotation of the motor 400 is completed.

Thus, the face-washing brush 600 is very rapidly rotated forwardly and reversely.

In a state that the electric motor 400 is rotated forward at the predetermined angle so that the spring 800 is bent at the maximum, if the electric motor starts to be reversely rotated, the restoring force of the spring 800 is added to the torque of the electric motor 400, so that the electric motor 400 is more quickly rotated. Since the spring 800 is bent at the maximum in an opposite direction after the spring 800 returns to the original position at the time that the reverse rotation is completed, the rotation direction of the electric motor 400 is quickly changed in the forward direction while the maximum torque is applied to the electric motor 400 at the moment that the rotation direction is changed.

As described above, since the electric motor 400 is operated while the electric motor 400 quickly turns the forward and reverse rotation direction, the strong torque is applied to the face-washing brush 600, so that the face-washing is performed at a strong force.

Program codes of a control circuit for rotating the rotor of the electric motor 400 forward and reverse at the predetermined angle may be stored in various storing devices and may be input to the control circuit to driving the electric motor 400. The computer-readable recording media include a ROM, a RAM, a CD-ROM, a magnetic table, a floppy disk, and an optical data storing device, and include a device realized in the form of a carrier wave (for example, transmission over the Internet). The computer-readable recording media are distributed into computer systems connected to each other through a network to store computer-readable codes through a distribution scheme so that the computer-readable codes may be executed. In addition, function programs, codes, and code segments used to realize the method can be easily deduced by programmers in the art to which the disclosure pertains.

Therefore, according to the present invention, the brushless electric motor is used and the operation mode of the brushless electric motor is set to rotate the rotor of the brushless electric motor forward and reverse at the predetermined angle. In addition, a strong torque is generated by the spring force, so that the facing washing is perfectly and conventionally performed.

EXPLANATION OF REFERENCE SIGNS

100: case of an apparatus for washing skin
200: operation unit
300: power supply unit
400: brushless electric motor
500: control unit
510: rectifying unit
520: smoothing condenser
530: inverter
540: control circuit
550: Power circuit
560: terminal voltage detecting unit
570: control circuit
580: PWM signal generating unit
600: face-washing brush
700: holder
800: spring
900: support
1000: balance weight

What is claimed is:

1. An apparatus for washing skin using brushless electric motor and a spring, the apparatus comprising:
   a case (100);
   an operation unit (200) installed outside the case to generate a switching signal to allow the apparatus to be powered on or off and the brushless electric motor to be rotated forward and reverse by a predetermined angle;
   a power supply unit (300) installed at one end inside the case;
   the brushless electric motor (400) installed inside the case to be operated by power applied from the power supply unit according to the switching signal from the operation unit, such that the brushless electric motor (400) is rotated by the predetermined angle;
   a control unit (500) to cutout an electric signal in order to control the forward and reverse rotation of the brushless electric motor by the predetermined angle according to the switching signal;
   a face-washing brush (600) fitted with a shaft of the brushless electric motor to be rotated forward and reverse as the brushless electric motor is operated;
   a holder (700) installed to the shaft of the brushless electric motor and including vertical and horizontal panels bent in a L-shape, wherein the holder is rotated forward and reverse as the brushless electric motor is rotated forward and reverse;
   a spring (800) including one side coupled to the horizontal panel of the holder and an opposite side coupled to a support, wherein the spring moves along the support to generate a torque toward an original position by an elastic property as the holder moves upward and downward in a vertical direction; and
   the support (900) to support the opposite side of the spring,
   wherein the control unit (500) includes a rectifying unit (510) including a rectifier (511) and a smoothing condenser (512) to rectify and smooth AC power in order to provide DC power;

an inverter (530) to convert the DC power supplied from the rectifying unit (510) into three-phase AC power (U, V and W) in a pulse form having an arbitrary variable frequency and to supply the three-phase AC power to the brushless electric motor (400), the inverter including six switching devices (Q1 to Q6) and diodes;

a terminal voltage detecting unit (560) to detect terminal voltages of each phase (U, V and W) from the three-phase AC power supplied to the brushless electric motor (400);

a control circuit (570) to obtain information about a position of the rotor by detecting zero cross points of back electromotive force based on the terminal voltages of each phase (U, V and W) detected by the terminal voltage detecting unit (560), and to control a pattern of a PWM signal provided to the inverter (530) in order to allow a rotor of the brushless electric motor to be rotated forward and reverse at the predetermined angle; and a PWM signal generating unit (580) to generate the pattern of the PWM signal under control of the control circuit (570) and provides the pattern of the PWM signal to the inverter (530).

2. The apparatus of claim 1, further comprising a balance weight (1000) provided to an upper portion of the holder to absorb a vibration caused by the forward and reverse rotation of the holder.

3. The apparatus of claim 1, wherein the spring (800) includes a coil spring or a leaf spring.

4. The apparatus of claim 3, wherein the holder (700) includes a moving hole (710) through which the leaf spring slides.

* * * * *